United States Patent
Bennis

(10) Patent No.: US 9,015,986 B2
(45) Date of Patent: Apr. 28, 2015

(54) SLIP BOBBER RIG

(76) Inventor: Gary Bennis, Eau Claire, WI (US)

( * ) Notice: Subject to any disclaimer, the term of this patent is extended or adjusted under 35 U.S.C. 154(b) by 667 days.

(21) Appl. No.: 12/236,356

(22) Filed: Sep. 23, 2008

(65) Prior Publication Data
US 2009/0013586 A1    Jan. 15, 2009

Related U.S. Application Data

(63) Continuation of application No. 11/130,891, filed on May 17, 2005, now Pat. No. 7,434,349.

(51) Int. Cl.
*A01K 91/047* (2006.01)
*A01K 93/00* (2006.01)

(52) U.S. Cl.
CPC ........................... *A01K 93/00* (2013.01)

(58) Field of Classification Search
USPC .................................. 289/1.5, 17; 43/44.91
See application file for complete search history.

(56) References Cited

U.S. PATENT DOCUMENTS

| | | | | |
|---|---|---|---|---|
| 2,779,121 A * | 1/1957 | Campbell | ............... | 43/43.15 |
| 3,131,957 A * | 5/1964 | Musto | ............... | 289/17 |
| 3,132,438 A * | 5/1964 | Ward et al. | ............... | 43/53.5 |
| 3,177,021 A * | 4/1965 | Benham | ............... | 289/17 |
| 3,252,724 A * | 5/1966 | Kearns | ............... | 289/17 |
| 3,738,692 A * | 6/1973 | Martuch et al. | ............... | 289/1.2 |
| 3,837,691 A * | 9/1974 | Smythe | ............... | 289/17 |
| 4,195,435 A * | 4/1980 | Kern | ............... | 43/44.87 |
| 5,971,447 A * | 10/1999 | Steck, III | ............... | 289/17 |

* cited by examiner

*Primary Examiner* — Kimberly Berona
(74) *Attorney, Agent, or Firm* — William D. Hare, Esq.; McNeely Hare & War LLP

(57) ABSTRACT

A slip bobber rig having an elongated member carrying a slip bobber and a bobber stop with one end of the line securable to a fishing line and the other end of the line securable to an article of fishing tackle as well as a method of attaching a slip bobber to a fishing line without having to thread the fishing line through the slip bobber.

23 Claims, 1 Drawing Sheet

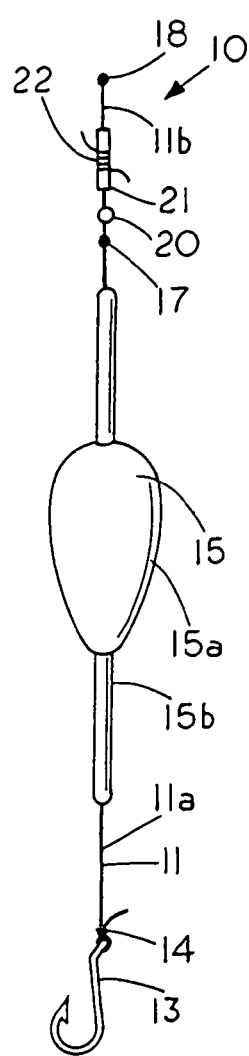
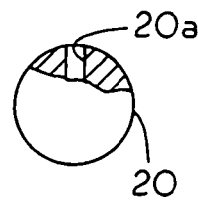
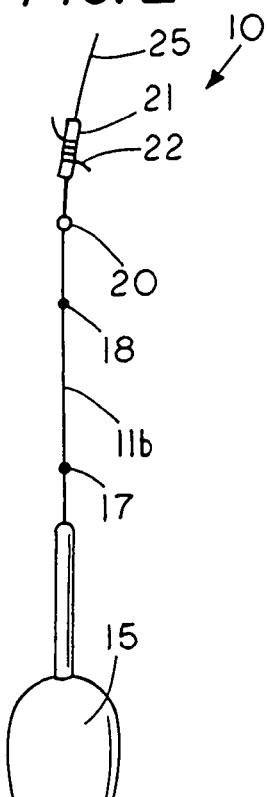
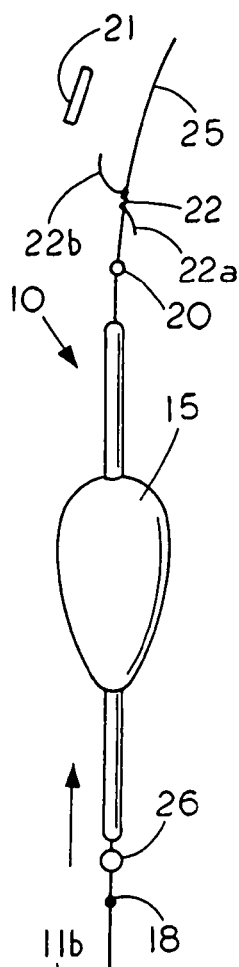
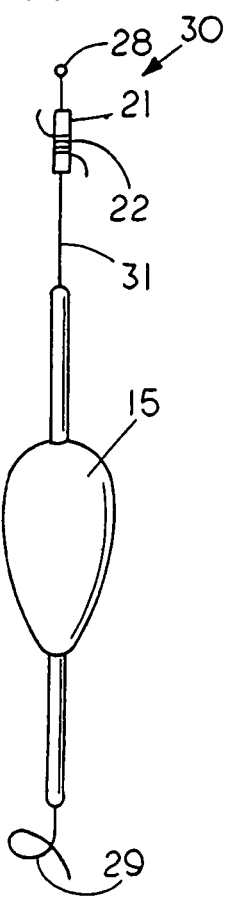
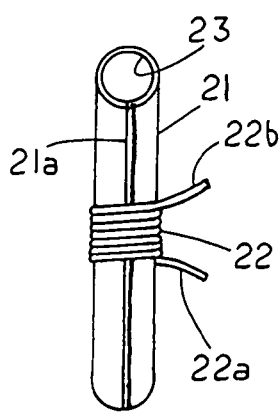

SLIP BOBBER RIG

CROSS REFERENCE TO RELATED APPLICATIONS

This application is a continuation of and claims priority from U.S. patent application Ser. No. 11/130,891, filed May 17, 2005 and titled Slip Bobber Rig, the contents of which are incorporated herein by reference in their entirety.

FIELD OF THE INVENTION

This invention relates generally to fishing rigs and, more specifically, to a slip bobber fishing rig that one can quickly attach to a fishing line.

BACKGROUND OF THE INVENTION

The use of slip bobbers are known in the art. Typically, a line stop, which is small enough to pass through the eye on a fishing rod or reel, is secured to a fishing line to form either a one piece bobber stop or part of a two piece bobber stop. In the two piece bobber stop, a bobber stop includes a hollow bead or the like that slides along the fishing line but because of the small passage therein the hollow bead cannot slide past the line stop, which is often a knot which is secured on the fishing line. While the slip bobber can slide freely along the line the slip bobber is restrained from sliding along the line by the coaction of the hollow bead and the line stop. For example, with the two piece bobber stop the line stop, which is often a string that is knotted to the fishing line, prevents the hollow bead from sliding therepast since the opening in the hollow bead is such that while it can slide freely along the fishing line the passage is sufficiently small so that it cannot slide past the line stop. On the other hand the slip bobber, which has an opening that is sufficiently large so it would slide past the line stop but is prevented from sliding along the fishing line by the exterior dimensions of the hollow bead which are larger than the internal passage in the slip bobber. Thus, as the hollow bead stop can not slide past the line stop and the slip bobber can not slide past the hollow bead the coaction of the hollow bead and the line stop form a two piece bobber stop that prevents the slip bobber from sliding up the line.

As a consequence the slip bobber and hollow bead can slide along the fishing line as the user winds the fishing line on the fishing reel. Once the line is cast the line, which is normally weighted with a sinker, slides through the slip bobber until the slip bobber is stopped by the engagement of the hollow bead with the line stop. The advantage of the system is that during use the line stop, which is small, can be wound on the reel while the bobber stop and slip bobber can slide to the terminal end of the fishing line to provide for ease in casting.

If the slip bobber has a sufficiently small size opening so it can not pass over the knot forming the line stop it can form a one piece bobber stop. That is, the line stop is sufficiently small to pass through the line guide on the fishing reel but the same time the line stop is sufficiently large so as to stop the slip bobber from sliding therepast thus eliminating the need for both a line stop and a hollow bead in the slip bobber rig.

One of difficulties with attaching a slip bobber to a fishing line is that a fisherperson needs to individually thread each of the components of the slip bobber rig on the fishing line in the proper sequence. In addition, since the items are generally small they are difficult to handle. That is, in a conventional method of attaching a slip bobber to a fishing line the fishing line is threaded into the hollow sleeve with a partly tied knot. Next, the hollow bead is threaded onto the fishing line. Finally, the slip bobber is threaded onto the fishing line and a hook or the like is secured to the free end of the fishing line. The field handling and assembling a slip bobber on a fishing line by individually threading the fishing line through the line stop, the hollow bead, the slip bobber and the hook to the fishing line can become frustrating, particularly, if the weather conditions are less than favorable and fingers are wet and cold.

The invention described herein comprises a ready to use slip bobber rig that can be quickly secured to a fishing line simply by attachment of the fishing line to the end of an elongated member that carries a bobber stop and a slip bobber. Once attached, the fisherperson can quickly position the line stop at the proper location on the line without having to individually thread multiple components onto a fishing line that often can result in placing the components on the fishing line in improper order for the slip bobber to function thus causing the person to have to rethread some or all of the components.

SUMMARY OF THE INVENTION

A slip bobber rig comprising an elongated member carrying a slip bobber and a bobber stop with one end of the line securable to a fishing line and the other end of the line securable to an article of fishing tackle as well as a method of attaching a slip bobber to a fishing line without having to thread the fishing line through the slip bobber.

BRIEF DESCRIPTION OF THE DRAWINGS

FIG. 1 shows one embodiment of a slip bobber rig for securing to a fishing line;

FIG. 1A shows a slotted sleeve carrying a partially pretied knot;

FIG. 1B shows a partial section view of a bobber stop;

FIG. 2 shows the slip bobber rig attached to a fishing line;

FIG. 3 shows the slip bobber and stop having been slid onto the fishing line 25; and FIG. 4 shows a second embodiment of the slip bobber rig.

DESCRIPTION OF THE PREFERRED EMBODIMENT

FIG. 1 shows one embodiment of a ready to use slip bobber rig 10 for attachment to a fishing line with the slip bobber rig 10 comprising an elongated member 11 having a flexible line 11a on the lower portion and a stiffer leader like member 11b on the upper end. An eye 17 connects elongated member 11a to elongated member 11b and eye 18 allows one to connect the fishing rig 10 to a fishing line. As shown the lower end 11a of elongated member 11 can attach to an article of fishing tackle, such as a fishing hook 13 or the like through a knot 14 or the like.

Located on the slip bobber rig 10 is a slip bobber 15 comprising a float 15a and an elongated tube 15b extending therethrough with the elongated tube 15b therein including an opening sufficiently large to allow slip bobber 15 to slide freely along a fishing line. In the embodiment shown in FIG. 1 the fishhook 13 can form a stop to prevent the slip bobber 15 from sliding off the end of the elongated member during handling and attachment of the slip bobber rig to a fishing line. However, other articles of fishing tackle including sinkers or the like could form a stop to retain the slip bobber 15 on the slip bobber rig 10 during transport and handling of the slip bobber rig 10. Similarly, the sleeve 22 can be sized to form a handling stop so as to require a slight force to slide the sleeve 22 over the eye 18 thus preventing the slip bobber 15 and hollow bead 20 from sliding off the leader like member 11. Thus, the slip bobber rig 10 with the various components can remain in condition for ready attachment to a fishing line.

FIG. 1 shows the leader like member 11b includes a first eye 17 on one end for securing to flexible line 11a and a second eye 18 on the opposite end for securing to the fishing line on a fisherperson's fishing reel. Located on leader like member 11b is a hollow bead 20 and a sleeve 21 with a partially pretied knot 22 thereon that can be secured to the fishing line to form a line stop. A sleeve or tube 21 with the partially pretied knot 22 located on the outside of an unslotted sleeve is known in the art and is sold by ROD-N-BOBB'S INC. of Eau Claire Wis. Typically, during individually assembly of a slip bobber on a fishing line the unslotted sleeve 21 is slipped onto a fishing line and a partially pretied knot, which is on the outside of the sleeve, is slid onto the line from the sleeve and the partially pretied knot is secured to the line by pulling on the protruding ends of the partiality pretied knot The unslotted sleeve 21 or tube is then slide off the end of the line and discarded. The other components of the slip bobber system can then be individually threaded onto the fishing line.

In the slip bobber rig shown in FIG. 1 the removability of the sleeve from the leader like member or line is enhanced by providing a slotted sleeve 21. FIG. 1A shows the partially pretied knot 22 located on a sleeve 21 having an elongated opening or slot 23 therein. Slotted sleeve 21 differs from the prior art sleeves with partially pretied knots in that sleeve 23 includes a lengthwise slot 21a that allows the sleeve 21 to be laterally removed from the leader like member 11b or fishing line rather than having to slide the sleeve off the end of the fishing line. As can be seen in FIG. 1 the slip bobber 15, the hollow bead 20 and the slotted sleeve 22 are all located on a separate slip bobber rig 10 which has an eye 18 that can be secured to a fishing line.

In some instance the line stop 22, which comprises a knot, can also function as the bobber stop for slip bobber rig 10. In those applications the slip bobber 15 includes an opening that is sufficiently small so that it will not slide over the knot 22 on the fishing line. This embodiment is shown in FIG. 4 and does not require the hollow bead 20.

In some cases the opening in the slip bobber is so large that if knot 22 were made large enough to form a bobber stop the knot 22 could not be wound on the user's reel. That is, if the knot is too large the knot would not pass through the guide on the fishing rod and reel and thus prevent the user from winding the fishing line on the reel. In those cases, a separate hollow bead 20, is used that can slide along the fishing line with the bead having a sufficiently small passage that will not pass over the knot 22 but having a sufficiently larger outer dimension that prevents the bobber 15 from sliding therepast. In those cases the coaction of the line stop 22 and the hollow bead 20 coact to prevent the bobber 15 from sliding past the knot 22 on the fishing line. While it is important for the line with the line stop to be wound on the reel it is also important that the line with the knot can slide freely through the eye on the rod and reel as the slip bobber is cast. This embodiment is illustrated in FIGS. 1-3.

In the embodiment shown in FIG. 1 the hollow bead 20 has an inner dimension that is sufficiently large to allow the hollow bead 20 to slid along the fishing line but has an outer dimension sufficiently large so as to prevent the slip bobber 15 from sliding thereover. Similarly, the eye 18 and the eye 17 on the leader like member 11b have a dimension sufficiently small so that the slip bobber 15 and the hollow bead 20 can slide thereover and onto the fishing line.

FIG. 1A shows an isolated view of removable sleeve 21 having a longitudinal slot 21a that allows the sleeve 21 to be laterally slid from the fishing line when the knot 22 has been slide therefrom and onto the fishing line.

FIG. 1B shows the hollow bead 20 for use when the line stop 22 formed by the knot is sufficiently small so as to pass through the opening in the slip bobber 15. In this instance the opening 20a in the hollow bead is sufficiently small so as to engage knot 22 and the outside of hollow bead 20 is sufficiently large to prevent the slip bobber from passing over hollow bead 20. Thus the coaction of the line stop 22 and the hollow bead 20 provide for a positionable bobber rig wherein the opening in the slip bobber might be sufficiently large so as to normally pass over the line stop formed by the line stop 22.

FIG. 2 shows a step in the process of securing the slip bobber rig 10 to a fishing line. In this view the fishing line 25 has been secured to upper eye 18 on the leader like member 11b. The slotted sleeve 21 with the partially pretied knot 22 thereon has been slid over the upper eye 18 and onto the fishing line 25. In addition, the hollow bead 20 has also been slid over the eye 18 and onto the fishing line 25. The slip bobber rig 10 is now ready for the step of bringing the slip bobber 15 into an operable condition.

FIG. 3 shows the partially pretied knot 22, which forms the line stop, has been removed from the slotted sleeve 21 and the ends 22a and 22b have been pulled to bring the partially pretied knot 22 into a tied condition that can be positioned along a fishing line to form a line stop. That is, the purpose of knot 22 is to provide a stop on the fishing line 25 that can be forcible slid along the fishing line but is normally held in position on fishing line 25 by the frictional forces between knot 22 and line 25. In addition, the knot 22 is sufficiently small so that the knot can pass through the line guide on a rod and reel to allow the line with the knot 22 to be wound on the fishing reel.

While the knot 22 must be sufficiently small so as pass through the guide on the fishing reel it also must be sufficiently large so that the hollow bead 20, which can slide along the fishing line, can not pass thereover. Consequently, when the hollow bead 20 engages the knot 22 the hollow bead 20 is prevented from moving up the fishing line. At the same time the slip bobber 15 is prevented from sliding over the hollow bead 20. Thus the knot 22 prevents hollow bead 20 from sliding up fishing line 25 and the hollow bead 20 prevents slip bobber 15 from sliding up fishing line 25.

As can be seen in FIG. 3 the slotted sleeve 21 has been removed from fishing line 25 by sliding the slotted sleeve laterally off the fishing line 25. That is, the slot 21a allows the sleeve 22 to be removed from the fishing line without having to slide the sleeve off the end of the fishing line. To complete the slip bobber fishing rig a sinker 26 can be attached to fishing line 25 and the free ends 22a and 22b of knot 22 can be cut off. The slip bobber rig 10 is now in a ready to fish condition.

FIG. 4 shows a second embodiment of the slip bobber rig 30 comprising an elongated member 31 having a first end 28 for securing to a fishing line and a second end 29 for securing an article of fishing tackle thereto. Fishing rig 30 does not use a hollow bead 20. A slip bobber 15 is carried on elongated member 31. A removable sleeve 21 is located on elongated member 31 with the removable sleeve 22 having a line stop such as a pretied knot 22 thereon slidable positionable from the elongated member 21 to a fishing line to form a slip bobber stop having an outer dimension sufficiently large to prevent passage through slip bobber 15 yet sufficiently small to be wound on a fishing reel.

Thus, the invention includes a field ready method of rigging a line with a slip bobber rig 30 comprising attaching one end of a slip bobber rig 30 having a removable sleeve 21 with a line stop such as a partially pretied knot 22 thereon to a free end of a fishing line. Sliding the removable sleeve 21 onto the fishing line 31, removing the removable sleeve 21 from the fishing line and securing the pretied knot 22 to the fishing line to form a line stop on the fishing line that also functions as a bobber stop.

In the embodiment with a removable sleeve the removable sleeve 21 includes a slot to allow the sleeve to be slid laterally free of the line by passing the fishing line through the slot. However, other types of removable sleeves could be used, for example, a cellulose sleeve that dissolves in water or a sleeve that can be torn free of the line without damaging the fishing line could also be used. In some instance the removable sleeve need not be used if the knot 22 is provided with sufficient integrity so as to maintain its positionability from the elongated member to the fishing line. In addition other line stops that can be wound on a reel and positioned along the fishing line could be used in the invention thus eliminating the need for a sleeve. In the embodiment shown hollow bead 20 can be an elastomer bead or a solid bead. In addition, the leader like member, which can be wire like could also be a one piece flexible line such as a fishing line that can be tied directly to the free end of the fishing line of the fisherperson. To maintain the ready-to-use rig one can prevent the bobber stop from coming off the rig during shipping and handling by securing a removable tag on the eyelet which is sufficiently large to prevent the bobber stop from sliding over the eyelet. The tag can contain instructions informing the fisherperson that the line should be tied into the eyelet. Once the line is attached to the eyelet the tag can then be discarded with the rig in a ready-to-use condition.

While a partly tied knot is shown in the preferred embodiment with the slip bobber fishing rig based on the teachings of the invention herein it is envisioned that other line stops can be first mounted on the slip bobber fishing rig and then transferred to the fishing line after the slip bobber rig has been secured to the end of a fishing line.

What is claimed is:

1. A method for applying a line stop to a fishing line for slip bobber fishing, the fishing line having a single free end, the method comprising:
   providing a fishing apparatus for slip bobber fishing comprising a line stop and a hollow tube, the hollow tube having an inner surface defining an inner diameter, an outer surface, a length defined by a first end and a second end, and a slot passing from the outer surface to the inner surface along at least a portion of the length of the hollow tube, and the line stop encircling at least a portion of the outer surface of the hollow tube;
   placing a free end of the fishing line through the hollow tube from the first end to the second end;
   advancing the hollow tube over the fishing line;
   sliding the line stop off either the first end or the second end of the hollow tube at a distance away from the free end of the fishing line; and
   removing the hollow tube from the fishing line by passing the fishing line through the slot.

2. The method of claim 1, wherein the line stop comprises a partially pre-tied knot and applying a line stop to the fishing line further comprises tightening the knot against the fishing line at a distance away from the free end of the fishing line.

3. The method of claim 2, wherein a line forming the pre-tied knot comprises two free ends adjacent to the pre-tied knot.

4. The method of claim 2, wherein a line forming the pre-tied knot comprises two free ends that are similar distances away from the pre-tied knot.

5. The method of claim 2, wherein upon tightening the knot to the fishing line, the knot can be slidably repositioned along the fishing line.

6. The method of claim 2, wherein tightening the knot against the fishing line comprises tightening the knot against only a fishing line.

7. The method of claim 1, further comprising attaching a hook to the free end of the fishing line, wherein the line stop is positioned on the fishing line at a distance away from the hook.

8. The method of claim 1, wherein the hollow tube is movable along the line to position the line stop at a position on the fishing line.

9. The method of claim 1, wherein the fishing apparatus further comprises a slip bobber positioned on the fishing line and a hook attached to the fishing line at a free end of the fishing line, and removing the line stop comprises removing the line stop from the hollow tube on to the fishing line such that the bobber is positioned between the hook and the line stop.

10. The method of claim 9, further comprising removing the hollow tube from the fishing line by passing the fishing line through the slot with the bobber positioned between the hook and the hollow tube.

11. The method of claim 9, wherein the fishing apparatus further comprises a bead having a channel therethrough with the fishing line passing through the channel and the bead being positioned on the fishing line between the hook and the line stop.

12. The method of claim 11, wherein the channel in the bead has a first opening and a second opening defining the channel through the bead and the bead is placed on the fishing line by passing the fishing line through the channel in the bead from the first opening to the second opening.

13. The method of claim 12, further comprising advancing the bead to the line stop, wherein the line stop has an outer diameter that is greater than the inner diameter of the channel through the bead.

14. The method of claim 11, wherein the slip bobber has a channel passing through at least a portion of the length of the slip bobber and the channel has an inner diameter that is less than the outer diameter of the bead, whereby the slip bobber cannot pass over the bead.

15. The method of claim 14, further comprising attaching an article of fishing tackle to the fishing line.

16. The method of claim 11, wherein the bead comprises an elastic bead.

17. The method of claim 1, wherein the slot passes along the entire length of the hollow tube.

18. The method of claim 1, wherein the hollow tube is configured to be removed from the fishing line when both ends of the fishing line are connected to fishing articles having a dimension greater than the inner diameter of the hollow tube.

19. The method of claim 1, wherein the fishing apparatus further comprises one or more of a fishing rod, a fishing reel, a hook, a slip bobber, a sinker, an article of fishing tackle, and a swivel.

20. The method of claim 1, wherein the line stop comprises a string or wire.

21. The method of claim 20, wherein the string or wire is a separate article from the fishing line.

22. A method for applying a line stop to a fishing line, the method comprising:

providing a fishing apparatus comprising a line stop and a hollow tube, the hollow tube having an inner surface defining an inner diameter, an outer surface, a length defined by a first end and a second end, and a slot passing from the outer surface to the inner surface along at least a portion of the length of the hollow tube, and the line stop encircling at least a portion of the outer surface of the hollow tube;

placing a free end of the fishing line through the hollow tube from the first end to the second end;

advancing the hollow tube over the fishing line;

sliding the line stop off either the first end or the second end of the hollow tube;

tightening the line stop against the fishing line;

removing the hollow tube from the fishing line by passing the fishing line through the slot; and attaching a hook to the free end of the fishing line, wherein the line stop is positioned on the fishing line at a distance away from the hook such that the line stop is not in contact with the hook.

23. A method for applying a line stop to a fishing line for slip bobber fishing, the method comprising:

providing a fishing apparatus for slip bobber fishing comprising a line stop and a hollow tube, the hollow tube having an inner surface defining an inner diameter, an outer surface, a length defined by a first end and a second end, and a slot passing from the outer surface to the inner surface along at least a portion of the length of the hollow tube, and the line stop encircling at least a portion of the outer surface of the hollow tube;

placing a fishing line through the hollow tube from the first end to the second end;

advancing the hollow tube over the fishing line;

sliding the line stop off either the first end or the second end of the hollow tube;

removing the hollow tube from the fishing line by passing the fishing line through the slot; and tightening the knot to the fishing line, wherein the knot is slidably repositionable along the fishing line after tightening the knot to the fishing line, wherein the line stop comprises a string or wire configured as a pre-tied knot having two free ends, the two free ends being positioned adjacent to the pre-tied knot.

* * * * *